United States Patent [19]

Bowen et al.

[11] 4,086,620
[45] Apr. 25, 1978

[54] PROCESSOR FOR INCREASING THE RUN-LENGTH OF FACSIMILE DATA

[75] Inventors: Edward George Bowen, Lawrence Harbor; Frank William Mounts, Colts Neck; Arun Narayan Netravali, Matawan, all of N.J.

[73] Assignee: Bell Telephone Laboratories, Incorporated, Murray Hill, N.J.

[21] Appl. No.: 734,387

[22] Filed: Oct. 21, 1976

[51] Int. Cl.² ............................................. H04N 7/12
[52] U.S. Cl. .................................. 358/260; 358/133; 358/261
[58] Field of Search ........................ 358/260, 261, 133

[56] References Cited

U.S. PATENT DOCUMENTS

| 2,978,535 | 4/1961 | Brown | 358/133 |
|---|---|---|---|
| 3,804,975 | 4/1974 | Abe | 358/261 |

*Primary Examiner*—Howard W. Britton
*Assistant Examiner*—Edward L. Coles
*Attorney, Agent, or Firm*—Richard J. Roddy

[57] ABSTRACT

A facsimile scene typically includes a plurality of lines, each line having a plurality of picture elements (pels). Often, pel signals are adaptable for run-length coding, a run being one or more successive pels having the same brightness level. To increase the length of a run and hence to permit a more efficient use of a transmission link, a processor is disclosed for permuting a measure of the pel signals responsive to a reference signal. Illustratively, the reference signal is the pel signal from a previous line. In one exemplary bi-level pel signal embodiment, the measure is the current pel signal. Specifically, if the reference pel signal is a logic one, the current pel signal is loaded beginning at one end of a memory; if the reference pel signal is a logic zero, the current pel signal is loaded beginning at the other end of the memory. In a second embodiment, the measure is an error signal for indicating a difference between the reference signal and the current pel signal. But for loading the error signal rather than the current pel signal, the operations aforedescribed are again followed.

10 Claims, 2 Drawing Figures

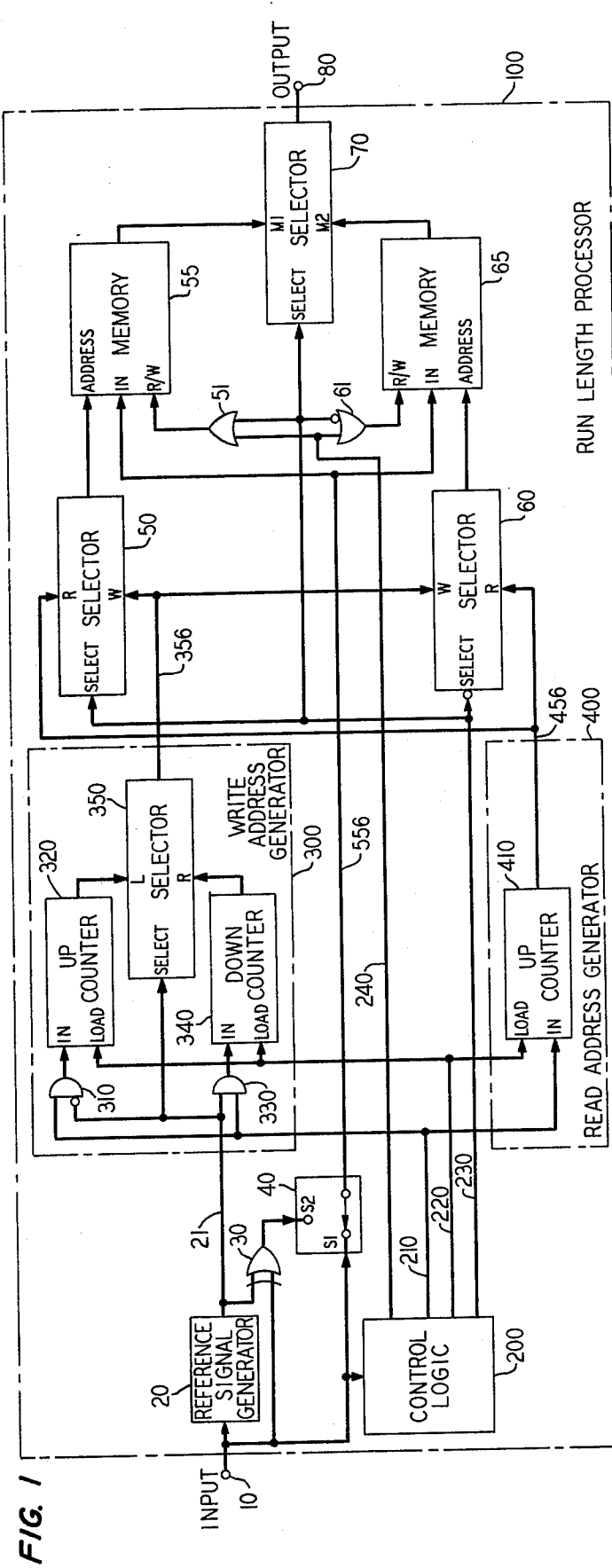

PROCESSOR FOR INCREASING THE RUN-LENGTH OF FACSIMILE DATA

BACKGROUND OF THE INVENTION

This invention relates to digital communication systems and, more particularly, to a processor arrangement employable in such systems for increasing the run length of digital signals.

In conventional facsimile systems, a picture image includes a plurality of lines, each line having a plurality of picture elements. Usually, within a facsimile system transmitter, a coder digitally encodes a voltage which varies in amplitude with the level of brightness of sequentially scanned picture elements (pels). The encoded voltage, hereinafter called the pel signal, is transmitted to a receiver where it is decoded and a facsimile of the picture image assembled.

Often, sequential picture elements have the same brightness level. As a result, the corresponding sequential pel signals are identical. Hence, an identical signal is repetitively transmitted. The resultant repetition of signals, known in the art as a run, leads to inefficient use of the transmission link between transmitter and receiver. To mitigate against the inefficient use, various run-length coding arrangements are known. A typical run-length coder extends two quanta of data to the receiver: one, the brightness level and the other, the length of the run, e.g., a count of the number of sequential picture elements having the same brightness level. Of course, the count could be one, but as the run-length increases, more efficient use of the transmission link is possible.

Accordingly, an object of our invention is to increase the length of a run in a facsimile system.

SUMMARY OF THE INVENTION

This and other objects of our invention are achieved by processing the facsimile data before the data are run-length coded. In particular, a processor permutes a measure of the facsimile data responsive to a reference signal. One measure is the input facsimile signal itself. A second measure is an error signal. Our illustrative error signal indicates a difference between a prior facsimile signal and the current input pel signal. Our illustrative reference signal is the prior facsimile signal. The run-length of the permuted signal is thereby increased to permit more efficient use of a transmission link.

BRIEF DESCRIPTION OF THE DRAWING

Our invention should become fully apparent when taken in conjunction with the following detailed description and the accompanying drawing in which:

FIG. 1 is a schematic block diagram illustrative embodiment of a processor in accordance with the principles of our invention and FIG. 2 summarizes an example of a process embodied within the processor of FIG. 1.

DETAILED DESCRIPTION

An illustrative embodiment incorporating the principles of our invention, schematically shown in FIG. 1 as run-length processor 100, increases the length of a run. Generally, digital facsimile pel signals are provided to input terminal 10. A measure of the pel signals is then reordered by processor 100. One measure may, for example, be the input pel signal. Hereinafter, we usually refer to the input pel signal rather than the measure, not as a limitation to the principles of our invention, but rather as a convenient descriptive mechanism. To emphasize this point we will later describe a second error signal measure. Thus, in the reordering, the input pel signals are permuted so that pel signals having the same brightness level are usually grouped together. The reordered pel signals are thereafter supplied to output terminal 80 for extension to a state-of-the-art run-length code for transmission to the receiver. Inasmuch as the reordering increases the run-length by grouping together pel signals having the same brightness level, more efficient use of the transmission link between transmitter and receiver is possible.

More particularly, according to the principles of our invention, the run-length of digital signal is increased by reordering a measure of an input pel signal responsive to a reference signal. Our illustrative reference signal is related to the pel signal detected at input terminal 10 during a prior reordering interval. As will shortly be made clear, during a current reordering interval, our illustrative reference signal is the pel signal so detected during the immediately prior reordering interval. Inasmuch as the previous line pel signal will usually have been transmitted to the receiver before or during the current reordering interval, our reference signal has a further advantage of not requiring additional control signals and, hence, permits a less complex receiver design for assembly of the facsimile picture image from the reordered signal.

In one illustrative embodiment, the measure is the input pel signal. Broadly, during a first reordering interval, each pel signal provided to input terminal 10 is temporarily buffered by being written in a cell of either random access memory 55 or 65. The cell address therefor is provided over lead 356 by a buffer address generator, here write address generator 300. Fortuitously, generator 300 does not usually provide contiguous addresses, but rather provides a write address which is permuted responsive to the reference signal extended thereto over lead 21 from reference signal generator 20. As a result, the input pel signal is written in the memory in reordered fashion. Later, during a second reordering interval, the reordered signal is sequentially read from the memory, the consecutive cell addresses being provided over lead 456 by read address generator 400. The read reordered signal is then supplied to output terminal 80 for extension to the state-of-the-art run-length encoder.

Before more particularly describing the details of a first illustrative embodiment we first describe, by use of an example, a process embodied therein. The example is summarized in FIG. 2. Let a reordering interval be taken as one line of the picture. Further, let the illustrated picture line consist of eight picture elements. Also, let each memory consist of eight cells, one cell for buffering one pel signal. Illustrative pel signals, columned left to right in the usual manner of a picture line, are identified by pel numbers one through eight. In that connection, the principles of our invention, being directed toward increasing the length of a run, are not limited by the number of encoded brightness levels. Rather, the principles apply equally well to a multi-bit pel signal. However, to clarify this aspect of our invention and as another convenient descriptive mechanism, the process is described in view of a bi-level facsimile system. Exemplary of a bi-level system is one for communicating a bi-level weather map. The descriptive convenience comes in part because bi-level brightness signals are explainable in terms of a single bit for each pel, typically a logic zero or logic one signal corresponding to a black or white brightness level, respectively. Returning to FIG. 2, rows one and two, labeled respectively "reference signal" and "input signal," include bi-level pel signals for, respectively, the previous line and the current line of the picture. Also, the third and fourth rows include reordered bi-level signals for two respective embodiments. In describing the first embodiment, switch 40 of processor 100 is at position S1. In addition, we find it convenient to assume each memory 55 and 65 to be an eight-cell memory and to think of the memory as a row of eight cells. That then allows us to speak of writing a pel signal in the left or right end of the memory, responsive to the reference signal on lead 21. In particular, if the bi-level reference signal is a logic one, the input pel signal is written commencing at the right end of the memory; if the reference signal is a logic zero, the input pel signal is written commencing at the left end of the memory. The writing continues from the left or right end of the memory toward its opposite end, i.e., toward the right or left end, respectively. Thus, in FIG. 2, input signal bit one, appearing in the second row as a logic one, responsive to reference signal bit one, seen in the first row to be a logic one, is written in the right end, i.e., in cell eight of the memory as shown in the third row. In analogous fashion, inasmuch as the writing commences at the right end for a logic one reference signal and continues toward the left end, input signal bit two, here also a logic one, is written in cell seven of the memory. However, since reference signal bit three is a logic zero, input signal bit three, also a logic zero, is written, commencing at the left end of the memory, i.e., in all one. The writing continues for each input pel signal detected during the reordering interval. Progressively, the memory is loaded from its ends toward its respective opposite end. Advantageously, it is clear that according to the principles of our invention, the reordered signal shown in row three has only three changes in logic state vis-a-vis the four state changes present in the input pel signal. Fortuitously, the thus reordered signal includes a concomitant increase in run-length.

Now follows a description of the first illustrative embodiment in FIG. 1 incorporating the aforedescribed process for reordering the input signal. More narrowly, each pel signal detected at input terminal 10 is jointly provided to an input of reference signal generator 20, an input of control logic 200, and through the S1 position of switch 40 over lead 556 to the IN inputs of memories 55 and 65. Reference signal generator 20 can be a simple delay circuit sufficient to store one picture line. Hence, the previous line reference signal output of generator 20 is extended over lead 21 to write address generator 300 and therewithin jointly to a first input of AND gate 330 and an inverting first input of AND gate 310. A second input of each AND gate is provided by control logic 200 over lead 210. The second input is a timing signal logic one provided in a straightforward manner responsive to the detection at terminal 10 of each input pel signal; otherwise, a logic zero is so provided. Thereafter, if the bi-level reference signal is a logic one, down-counter 340, initialized over cable 220 at the start of the reordering interval to contain the cell address for the right-end of the memory, is decremented. On the other hand, if the reference signal is a logic zero, up-counter 320, initialized over cable 220 also at the start of the reordering interval to contain the left-end memory cell address, is incremented. The left or right cell address is supplied from an output of counter 320 or 340, respectively, to a L or R input of selector 350. The left or right cell address is selected by selector 350 responsive respectively to the detection of a logic zero or logic one reference signal at a SELECT input thereof, the SELECT input signal illustratively being the reference signal. Thereby, the write address is permuted. The permuted write address is thereafter supplied over lead 356 jointly to a write (W) input of each of selectors 50 and 60 for extension to an ADDRESS input of one of memories 55 and 65.

As to which memory the permuted write address is extended, a memory is written or read during alternate reordering intervals. Specifically, during a first reordering interval, memory 55, for example, is written while memory 65 is read; then, during the next interval, the memory roles are reversed. The memory to be written or read is enabled for writing or reading responsive to a binary signal provided by control logic 200 over lead 230 jointly to each R/W memory input. Of course, to eliminate writing or reading the improper memory cell, the signal timing at the inputs thereof must be consistent with the requirements of the standard random access memory that is used. However, such signal timing, here provided over lead 240 to an input of OR gates 51 and 61, is well known and need not be described in detail to understand the broad principles of our invention. More particularly, a memory is enabled for writing responsive to the detection of a logic one at the R/W input thereof and for reading responsive to a logic zero thereat. Thus to use alternating memories, the R/W input of one memory, here memory 65, is inverted by way of a second input of OR gate 61. Coincidentally, the binary signal on lead 230 is jointly extended to a SELECT input of each of selectors 50, 60 and 70. Thereby, a logic one signal on lead 230 enables selector 50 to extend the write address provided over lead 356 to the ADDRESS input of memory 55 and enables memory 55 by way of a logic one at its R/W input to write the pel signal on lead 556 in a cell the appropriate end of a memory. Concurrently, and pointing out the alternating memory roles during alternate reordering intervals, the logic one signal on lead 230 is also extended to the SELECT input of selector 70. Responsive thereto, an output of memory 65, the memory then being read, is extended through input M2 of selector 70 to output terminal 80. In that respect, the read address is provided by up-counter 410 of generator 400 over lead 456 through selector 60 to the ADDRESS input of memory 65. Specifically, at the start of the reordering interval, up-counter 410 is initialized over cable 220 to contain the address of the cell at the left-end of the memory to be read and is thereafter incremented responsive to each logic one timing signal extended thereto over lead 210. Thus, in our first illustrative embodiment, although the write address is permuted for loading the input pel signal in the memory, the read address is not so permuted. Rather, the reordered signal is read sequentially from the memory and provided to output terminal 80. Thereby, the input pel signal is reordered responsive to the reference signal to increase the run-length.

In a second illustrative embodiment of the principles of our invention, the measure is an error signal. Broadly, the run-length of facsimile data is increased responsive to a reference signal by reordering the error signal rather than the input signal and supplying the error signal to output terminal 80. Our error signal indicates a difference between the reference signal and the input pel signal. The second embodiment becomes functional with switch 40 at position S2. In that position, signals at input terminal 10 and on lead 21 are provided to respective first and second inputs of exclusive OR gate 30. Write address generator 300 provides a permuted address as described above. However, rather than extend the input signal from terminal 10 over lead 556 to the IN inputs of memories 55 and 65, the error signal is so supplied. In particular, by way of exclusive OR gate 30, a logic zero is supplied to be written in a memory cell if the current and reference pel signals are identical, otherwise a logic one is supplied. Referring to row 4 of FIG. 2, the resultant reordered signal, according to this second embodiment of the principles of our invention, has only two changes in logic state vis-a-vis the three-state changes present according to the first embodiment and the four-state changes present in the input pel signal. Fortuitously, the thus reordered signal contains a concomitant increase in run-length.

Although the invention has been described and illustrated in detail with respect to a processor for permuting bi-level facsimile signals, it is to be understood that the same is not by way of limitation. The spirit and scope of our invention is limited only by the terms of the appended claims.

We claim:

1. Apparatus for increasing the run-length of a first digital signal comprising
   an input terminal adapted to receive said first signal,
   means for providing a measure of said first signal,
   means for supplying a reference signal,
   means responsive to said reference signal for permuting said signal measure, said permuting means including
   means responsive to a first state of said reference signal for ordering a first element of said signal measure in a first manner, and
   means for extending said permuted signal measure to an output terminal.

2. The apparatus defined in claim 1 wherein said measure is said first digital signal.

3. The apparatus defined in claim 1 wherein said measure is an error signal for indicating a functional relationship between said first digital signal and said reference signal.

4. The apparatus defined in claim 1 wherein said reference signal supplying means includes means for generating said reference signal as a function of a second digital signal received at said input terminal.

5. The apparatus defined in claim 4 wherein said generating means includes means for delaying said second signal until said first signal is received at said input terminal.

6. The apparatus defined in claim 1 wherein said permuting means includes means for buffering said signal measure in a reordered manner.

7. The apparatus defined in claim 6 wherein said buffering means includes
   a buffer,
   a permuting buffer address generator, and
   means for selecting a buffer responsive to a permuted buffer address.

8. The apparatus defined in claim 7 wherein said extending means includes means for coupling said signal measure through said buffer to said output terminal.

9. A method for increasing the run-length of a first digital signal comprising the steps of:
   receiving said first signal,
   providing a measure of said first signal,
   generating a reference signal,
   permuting said signal measure responsive to said reference signal,
   said permuting step including the step of ordering a first element of said signal measure in a first manner responsive to a first state of said reference signal, and
   extending said permuted signal measure to an output terminal.

10. Apparatus for processing a digital signal to be run-length coded, said apparatus including an input terminal adapted to receive said digital signal and characterized in that said apparatus comprises
    means for storing a reference signal;
    means responsive to said reference signal for permuting said digital signal, said permuting means including
    means responsive to a first state of said reference signal for ordering a first element of said digital signal in a first manner, and
    means responsive to a second state of said reference signal for ordering a second element of said digital signal in a second manner; and
    means responsive to said permuting means for extending said permuted digital signal to an output terminal.

* * * * *